(12) United States Patent
Laukhuf

(10) Patent No.: US 6,605,776 B1
(45) Date of Patent: Aug. 12, 2003

(54) MOUNTING ASSEMBLY FOR AN ELECTRICAL DISTRIBUTION BLOCK IN MODULAR OFFICE FURNITURE

(75) Inventor: Gregg E. Laukhuf, Bryan, OH (US)

(73) Assignee: Dekko Engineering, Inc., Kendallville, IN (US)

( * ) Notice: Subject to any disclaimer, the term of this patent is extended or adjusted under 35 U.S.C. 154(b) by 0 days.

(21) Appl. No.: 10/157,165

(22) Filed: May 29, 2002

(51) Int. Cl.[7] ................................................. H02G 3/08
(52) U.S. Cl. ........................ 174/48; 174/50; 220/3.2; 439/357; 439/215
(58) Field of Search ............................ 174/48, 49, 50, 174/60, 67, 68.3; 52/226.7, 239, 220.1, 220.3, 220.5; 4398/215, 216, 211, 357, 540.1; 220/3.2, 3.3, 3.9, 3.8

(56) References Cited

U.S. PATENT DOCUMENTS

| | | | | |
|---|---|---|---|---|
| 4,278,834 A | * | 7/1981 | Boundy | 174/48 |
| 5,164,544 A | * | 11/1992 | Snodgrass et al. | 174/48 |
| 5,214,889 A | * | 6/1993 | Nienhuis et al. | 52/220.7 |
| 5,259,787 A | * | 11/1993 | Byrne | 439/532 |
| 5,277,005 A | * | 1/1994 | Hellwig et al. | 174/48 |
| 5,349,135 A | * | 9/1994 | Mollenkopf et al. | 174/48 |
| 5,557,895 A | * | 9/1996 | Bendrell | 52/220.7 |
| 5,886,295 A | * | 3/1999 | Carino et al. | 174/48 |
| 5,913,787 A | * | 6/1999 | Edwards | 174/48 |
| 6,036,517 A | * | 3/2000 | Byrne | 439/573 |
| 6,098,358 A | * | 8/2000 | Waalkes et al. | 52/239 |
| 6,230,459 B1 | * | 5/2001 | Jeffers et al. | 52/239 |
| 6,343,947 B1 | * | 2/2002 | Byrne | 220/3.9 |
| 6,362,420 B1 | * | 3/2002 | Bacouelle et al. | 174/48 |
| 6,442,909 B2 | * | 9/2002 | Waalkes et al. | 52/239 |

* cited by examiner

Primary Examiner—Dean A. Reichard
Assistant Examiner—Angel R. Estrada
(74) Attorney, Agent, or Firm—Taylor & Aust, P.C.

(57) ABSTRACT

A modular office furniture system includes a modular office furniture component and an electrical distribution block carried by the furniture component. The electrical distribution block includes at least one electrical connector and a mounting assembly. The mounting assembly includes a pair of generally L-shaped lugs spaced apart from and facing toward each other. At least one of the lugs is movable and biased to a latched position.

24 Claims, 2 Drawing Sheets

MOUNTING ASSEMBLY FOR AN ELECTRICAL DISTRIBUTION BLOCK IN MODULAR OFFICE FURNITURE

BACKGROUND OF THE INVENTION

1. Field of the Invention

The present invention relates to electrical distribution systems in modular office furniture, and, more particularly, to a mounting assembly for an electrical distribution block in modular office furniture.

2. Description of the Related Art

Modular wall systems are used in many situations to construct temporary, or at least rearrangeable office configurations. With a proliferation of computer work stations, and the decreasing costs for obtaining and operating various office equipment including printers, scanners, fax machines and the like, the installations of such equipment have increased, and there is an ever increasing need for electrical, communication and data transmission circuits in each defined work space. Rearrangement of the work space defined by the panels, and/or rearrangement of the equipment within the workspace, can result in the need to relocate the various electrical receptacles to avoid unsightly and unsafe dependence on extension cords.

To meet the need for relocateable and expandable electrical, data and communication circuitry in modular wall systems, it is known to provide a wire raceway in the modular wall panel, commonly near the bottom thereof. Modular electrical circuit components may include electrical distribution blocks, jumper cables and electrical receptacles that can be combined and configured to achieve desired office configurations.

Electrical distribution blocks are typically connected with and carried by the bottom edge of the wall panel within the raceway. An electrical distribution block may include flanges which are screwed or otherwise attached to the bottom edge of the wall panel. Alternatively, a mounting bracket may be attached to the bottom edge of the wall panel, and the distribution block coupled with the mounting bracket. Various mounting arrangements exist for coupling the distribution block with such a mounting bracket.

What is needed in the art is a quick and easy way of attaching an electrical distribution block to a mounting bracket at the bottom of the wall panel using either specially configured or existing mounting brackets.

SUMMARY OF THE INVENTION

The present invention relates to a mounting assembly for an electrical distribution block used in conjunction with a modular office furniture component. The mounting assembly couples with a mounting bracket attached to the modular office furniture component. The mounting assembly includes a pair of generally L-shaped lugs which couple with respective oppositely extending flanges of the mounting bracket. One of the L-shaped lugs is slidably moved away from the corresponding flange of the mounting bracket when engaged therewith, and snaps into place over the flange to a latched position.

The invention comprises, in one form thereof, a modular office furniture system including a modular office furniture component and an electrical distribution block carried by the furniture component. The electrical distribution block includes at least one electrical connector and a mounting assembly. The mounting assembly includes a pair of generally L-shaped lugs spaced apart from and facing toward each other. At least one of the lugs is movable and biased to a latched position.

The electrical distribution system includes, in another embodiment, a mounting bracket having a pair of oppositely extending flanges and a locking tab. The mounting bracket flanges are respectively received within the L-shaped lugs, and the locking tab is received within a slot defined by a pair of walls on the electrical distribution block.

An advantage of the present invention is that the electrical distribution block is coupled with the mounting bracket in a snap-lock manner, without the use of tools.

Another advantage is that the mounting assembly of the electrical distribution block may be configured to couple with existing mounting brackets of a modular office furniture component, such as a wall panel.

Yet another advantage is that one or both of the L-shaped lugs may be configured as spring-loaded, movable lugs.

A further advantage is that the overall appearance of the electrical distribution block is not significantly aestaetically altered.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
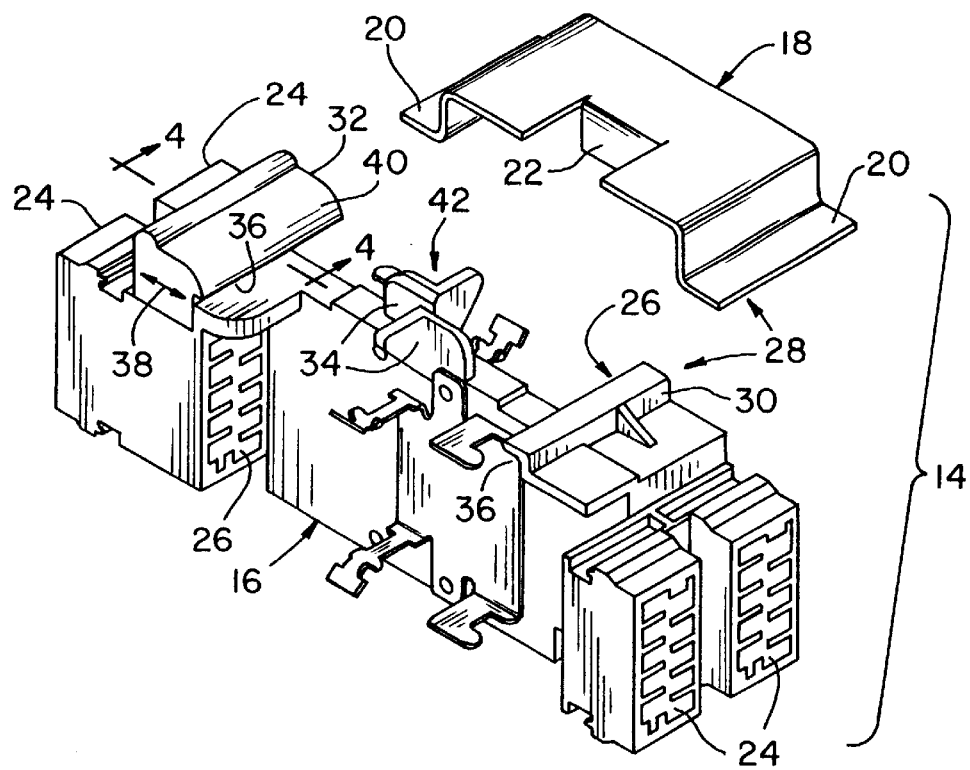
FIG. 1 is a perspective, exploded view of an embodiment of an electrical distribution system of the present invention.
Figure 2:
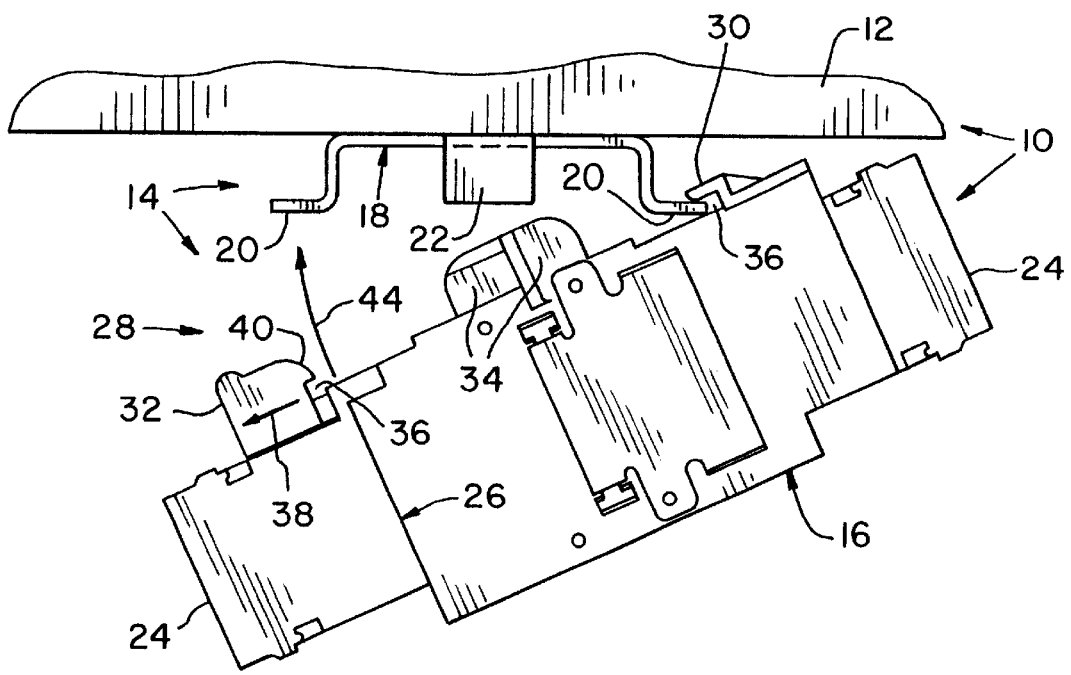
FIG. 2 is a side view of the electrical distribution system of FIG. 1, with the electrical distribution block shown in a rotated position relative to the mounting bracket.
Figure 3:
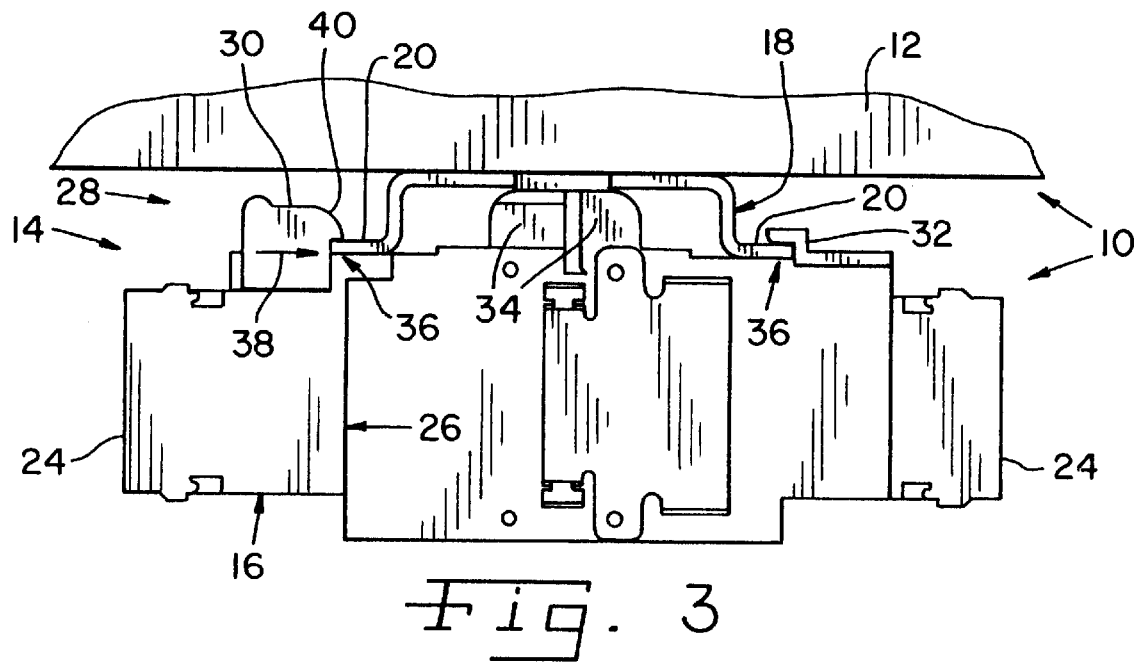
FIG. 3 is a side view of the electrical distribution block and mounting bracket of FIG. 2, with the electrical distribution block snapped into place on the mounting bracket.

Referring now to the drawings, and more particularly to FIGS. 1–3, there is shown an embodiment of a modular office furniture system 10 of the present invention, which generally includes a modular office furniture component 12 and an electrical distribution system 14. Furniture component 12 in the embodiment shown is a modular wall panel, but could also be a worksurface, raised floor, storage bin, etc.

Electrical distribution system 14 generally includes an electrical distribution block 16 and a mounting bracket 18. Mounting bracket 18 is attached to and carried by furniture component 12 in any suitable manner, such as screws, adhesive bonding or the like. Mounting bracket 18 includes a pair of oppositely extending flanges 20 and a locking tab 22. Flanges 20 extend generally perpendicular to the longitudinal extension of mounting bracket 18. Locking tab 22 extends generally parallel to the longitudinal extension of mounting bracket 18, and generally perpendicular to flanges 20.

Electrical distribution block 16 includes a plurality of electrical connectors for coupling with other modular components in electrical distribution system 14, such as electrical receptacles, jumper cables, etc. In the embodiment shown, electrical distribution block 16 includes four end connectors 24 and two electrical receptacle connectors 26. End connectors 24 and electrical receptacle connectors 26 may be configured with any suitable porting and keying arrangement, depending upon the particular application.

Electrical distribution block 16 also includes a mounting assembly 28 for mounting electrical distribution block 16 with mounting bracket 18. Mounting assembly 28 includes a pair of generally L-shaped lugs 30, 32 and a pair of walls 34. L-shaped lugs 30 and 32 are spaced apart from each other along the longitudinal extension of electrical distribution block 16. L-shaped lugs 30 and 32 face toward each other, meaning that a retaining opening 36 defined by each lug 30 and 32 face toward each other. Each lug 30 and 32, and thus each corresponding retaining opening 36, is positioned generally perpendicular to the longitudinal extension of electrical distribution block 16. L-shaped lugs 30 and 32 are in the form of L-shaped flanges in the embodiment shown, but may also be configured differently, such as a square or rectangular block having retaining openings 36 respectively formed therein.

Lug 30 is fixed and does not move with respect to electrical distribution block 16. Lug 30 receives a flange 20 of mounting bracket 18 therein, as will be described in more detail hereinafter.

Lug 32 is slidably movable in directions toward and away from lug 30, as indicated by arrow 38. Lug 32 includes a curved ramped surface 40 which, upon engagement with a flange 20 of mounting bracket 18, causes a force component to be exerted against lug 32 causing sliding movement in a direction 38 away from lug 30, as will be described in more detail hereinafter. The particular shape or curvature of ramped surface 40 may vary, depending upon the particular application.

Figure 4:
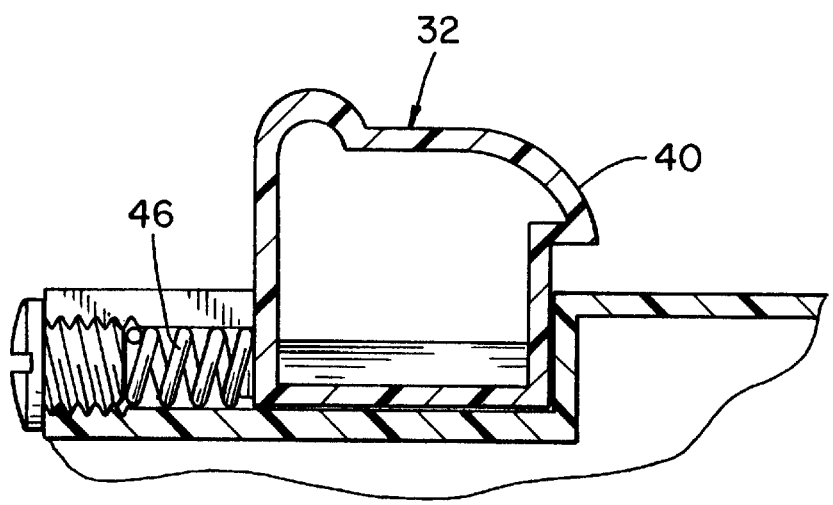
FIG. 4 is a fragmentary, sectional view illustrating the sliding arrangement of the movable L-shaped lug.

Lug 32 is biased to a latched position closest to lug 30 using one or more compression springs 46 (FIG. 4). In the embodiment shown, a pair of compression springs 46 are inserted within the larger portion of respective keyholes along which lug 32 slidably moves.

Walls 34 are positioned between lugs 30 and 32 in a direction generally parallel to the longitudinal extension of electrical distribution block 16. Walls 34 define a slot 42 therebetween which likewise extends parallel to the longitudinal extension of electrical distribution block 16, and generally perpendicular to lugs 30 and 32. Slot 42 receives locking tab 22 therein, as will be described in more detail hereinafter.

During assembly, mounting bracket 18 is attached to modular wall panel 12 using fasteners or the like. Electrical distribution block 16 is then positioned relative to mounting bracket 18 such that lug 30 receives a flange 20 of mounting bracket 18 therein (FIG. 2). Electrical distribution block 16 is then pivoted relative to the engaged flange 20 of mounting bracket 18, such as indicated by directional arrow 44 in FIG. 2. As electrical distribution block 16 is pivoted to the latched position shown in FIG. 3, locking tab 22 is received within slot 42 defined between walls 34, thereby preventing lateral movement of electrical distribution block 16 relative to mounting bracket 18 (i.e., in a direction generally perpendicular to the drawing plane of FIGS. 2 and 3). Ramped surface 40 of lug 32 is then engaged with the distal edge of the opposing flange 20 of mounting bracket 18, which results in sliding movement of lug 32 away from lug 30 as indicated by arrow 38 in FIG. 2. When the opposing flange 20 of mounting bracket 18 is received within the retaining opening 36 of lug 32, the spring force applied to lug 32 using compression springs 46 snap-locks lug 32 into the last position closest to lug 30, as shown in FIG. 3.

To decouple electrical distribution block 16 from mounting bracket 18, lug 32 is manually slid in a direction away from lug 30 such that the corresponding flange 20 may be freely removed from retaining opening 36. Electrical distribution block 16 is then pivoted in a direction opposite to direction 44 shown in FIG. 2, and lug 30 is decoupled with the corresponding flange 20.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A modular office furniture system, comprising:
a modular office furniture component; and
an electrical distribution system carried by said furniture component, including an electrical distribution block including at least one electrical connector and a mounting assembly, said mounting assembly including a pair of generally L-shaped lugs spaced apart from and facing toward each other, at least one of said lugs being movable and biased to a latched position, one said lug is slidable in directions toward and away from an other said lug, said latched position of said one lug being a position of said one lug closest to said other lug.

2. The modular office furniture system of claim 1, further including at least one spring associated with said one lug for biasing said one lug to said latched position.

3. The modular office furniture system of claim 1, said one lug including a ramped surface on a side thereof generally facing toward said other lug.

4. The modular office furniture system of claim 3, wherein said ramped surface comprises a curved ramped surface.

5. A modular office furniture system, comprising:
a modular office furniture component; and
an electrical distribution system carried by said furniture component including an electrical distribution block including at least one electrical connector and a mounting assembly, said mounting assembly including a pair of generally L-shaped lugs spaced apart from and facing toward each other, at least one of said lugs being slidably movable and biased to a latched position.

6. The modular office furniture system of claim 5, wherein said electrical distribution block has a longitudinal extension, said L-shaped lugs being spaced apart from each other in a direction of said longitudinal extension and positioned generally perpendicular to said longitudinal extension.

7. The modular office furniture system of claim 5, said mounting assembly including a pair of walls positioned between said lugs, said walls being generally parallel to each other and defining a slot therebetween.

8. The modular office furniture system of claim 7, said slot extending in a direction generally perpendicular to each of said lugs.

9. The modular office furniture system of claim 7, further including a mounting bracket having a pair of oppositely extending flanges and a locking tab, said mounting bracket flanges being respectively received within said L-shaped lugs, said locking tab being received within said slot.

10. The modular office furniture system of claim 5, wherein said L-shaped lugs comprise L-shaped flanges.

11. The modular office furniture system of claim 5, wherein said furniture component comprises a modular wall panel.

12. An electrical distribution system, comprising:
   an electrical distribution block including at least one electrical connector and a mounting assembly, said mounting assembly including a pair of generally L-shaped lugs spaced apart from and facing toward each other, at least one of said lugs being slidably movable and biased to a latched position.

13. The electrical distribution system of claim 1, wherein said electrical distribution block has a longitudinal extension, said L-shaped lugs being spaced apart from each other in a direction of said longitudinal extension and positioned generally perpendicular to said longitudinal extension.

14. The electrical distribution system of claim 1, said mounting assembly including a pair of walls positioned between said lugs, said walls be generally parallel to each other and defining a slot therebetween.

15. The electrical distribution system of claim 14, said slot extending in a direction generally perpendicular to each of said lugs.

16. The electrical distribution system of claim 14, further including a mounting bracket having a pair of oppositely extending flanges and a locking tab, said mounting bracket flanges being respectively received within said L-shaped lugs, said locking tab being received within said slot.

17. The electrical distribution system of claim 1, wherein said L-shaped lugs comprise L-shaped flanges.

18. An electrical distribution system, comprising:
   an electrical distribution block including at least one electrical connector and a mounting assembly, said mounting assembly including a pair of generally L-shaped lugs spaced apart from and facing toward each other, at least one of said lugs being movable and biased to a latched position, one said lug is slidable in directions toward and away from an other said lug, said latched position of said one lug being a position of said one lug closest to said other lug.

19. The electrical distribution system of claim 18, further including at least one spring associated with said one lug for biasing said one lug to said latched position.

20. The electrical distribution system of claim 18, said one lug including a ramped surface on a side thereof generally facing toward said other lug.

21. The electrical distribution system of claim 20, wherein said ramped surface comprises a curved ramped surface.

22. A method of coupling an electrical distribution block to a modular office furniture component, comprising the steps of:
   providing the modular office furniture component with a mounting bracket having a pair of oppositely extending flanges and a locking tab;
   providing an electrical distribution block including at least one electrical connector and a mounting assembly, said moving assembly including a pair of generally L-shaped lugs spaced apart from and facing toward each other, one of said lugs being fixed and an other of said lugs being movable and biased to a latched position;
   positioning one of said mounting bracket flanges within said one lug;
   pivoting said electrical distribution block relative to said one mounting bracket flange;
   engaging an other of said mounting bracket flanges against said other lug;
   moving said other lug away from said other mounting bracket flange;
   latching said other mounting bracket flange within said other lug;
   providing said other lug with a ramped surface on a side thereof generally facing toward said one lug; and
   said engaging step including engaging said other mounting bracket flange against said ramped surface.

23. A method of coupling an electrical distribution block to a modular office furniture component, comprising the steps of:
   providing the modular office furniture component with a mounting bracket having a pair of oppositely extending flanges and a locking tab;
   providing an electrical distribution block including at least one electrical connector and a mounting assembly, said mounting assembly including a pair of generally L-shaped lugs spaced apart from and facing toward each other, one of said lugs being fixed and an other of said lugs being slidably movable and biased to a latched position;
   positioning one of said mounting bracket flanges within said one lug;
   pivoting said electrical distribution block relative to said one mounting bracket flange;
   engaging an other of said mounting bracket flanges against said other lug;
   moving said other lug away from said other mounting bracket flange; and
   latching said other mounting bracket flange within said other lug.

24. The method of claim 23, including the steps of:
   providing said mounting assembly with a pair of walls positioned between said lugs, said walls being generally parallel to each other and defining a slot therebetween; and
   locating said locking tab within said slot.

\* \* \* \* \*

UNITED STATES PATENT AND TRADEMARK OFFICE
CERTIFICATE OF CORRECTION

PATENT NO. : 6,605,776 B1
DATED : August 12, 2003
INVENTOR(S) : Laukhuf

It is certified that error appears in the above-identified patent and that said Letters Patent is hereby corrected as shown below:

Column 5,
Lines 21, 27, and 39, please delete "claim 1", and substitute therefore, -- claim 12 --.

Column 6,
Line 6, please delete "moving", and substitute therefore, -- mounting --.

Signed and Sealed this

Sixth Day of July, 2004

JON W. DUDAS
*Acting Director of the United States Patent and Trademark Office*